US008903386B2

(12) United States Patent
Henttonen et al.

(10) Patent No.: US 8,903,386 B2
(45) Date of Patent: Dec. 2, 2014

(54) MME NAME IN MAP INSERT SUBSCRIBER DATA OPERATION

(75) Inventors: Jari Juhani Henttonen, Kerava (FI); Laszlo Janosi, Budapest (HU); Juha Matias Kallio, Vantaa (FI); Istvan Szabo, Budapest (HU); Ulrich Wiehe, Bad Hersfeld (DE); Curt Wong, Sammamish, WA (US)

(73) Assignee: Nokia Solutions and Networks Oy, Espoo (FI)

( * ) Notice: Subject to any disclaimer, the term of this patent is extended or adjusted under 35 U.S.C. 154(b) by 611 days.

(21) Appl. No.: 13/035,080

(22) Filed: Feb. 25, 2011

(65) Prior Publication Data

US 2011/0269482 A1 Nov. 3, 2011

Related U.S. Application Data

(60) Provisional application No. 61/329,900, filed on Apr. 30, 2010.

(51) Int. Cl.
*H04W 4/00* (2009.01)
*H04W 8/10* (2009.01)
*H04W 48/20* (2009.01)
*H04W 84/04* (2009.01)

(52) U.S. Cl.
CPC .............. *H04W 8/10* (2013.01); *H04W 48/20* (2013.01); *H04W 84/042* (2013.01)
USPC ........ 455/435.1; 455/436; 455/458; 455/417; 455/433

(58) Field of Classification Search
USPC ........... 455/417, 428, 432.3, 433, 435.1, 458, 455/436
See application file for complete search history.

(56) References Cited

U.S. PATENT DOCUMENTS

2010/0265884 A1* 10/2010 Vikberg et al. ............... 370/328
2010/0331023 A1* 12/2010 Cai et al. ...................... 455/466

OTHER PUBLICATIONS

3GPP TS 23.402 V 9.4.0 (Mar. 2010) "3rd Generation Partnership Project; Technical Specification Group Services and System Aspects; Architecture Enhancements for Non-3GPP Accesses" (Release 9), 198 pages.
3GPP TS 23.401 V 8.9.0 (Mar. 2010), 3rd Generation Partnership Project; Technical Specification Group Services and System Aspects; General Packet Radio Service (GPRS) Enhancements for Evolved Universal Terrestrial Radio Access Network (E-UTRAN) access (Release 8), 241 pages.
3GPP TS 23.272 V 9.3.0 (Mar. 2010), 3rd Generation Partnership Project; Technical Specification Group Services and System Aspects; Circuit Switched (CS) Fallback in Evolved Packet System (EPS); Stage 2 (Release 9), 66 pages.

(Continued)

*Primary Examiner* — Kwasi Karikari
(74) *Attorney, Agent, or Firm* — Squire Patton Boggs (US) LLP

(57) ABSTRACT

Embodiments of the invention include a method, apparatus, and computer readable medium related to mobility management. The method, apparatus, and computer readable medium may include, at least, receiving, at a network node, a terminating request from a user equipment. The method, apparatus and computer readable medium may further include, in response to receiving the terminating request, performing a restore data procedure, receiving a mobility management entity (MME) name from another network element in response to the restore data procedure, and registering the MME name to the subscriber data associated with the user equipment. The method, apparatus and computer readable medium may then include sending a paging request to the MME indicated by the MME name received from the other network element.

25 Claims, 5 Drawing Sheets

(56) References Cited

OTHER PUBLICATIONS

ETSI TS 123 008 V 9.2.0 (Apr. 2010), "Digital Cellular Telecommunications System (Phase 2+); Universal Mobile Telecommunications System (UMTS); LTE; Organization of Subscriber Data (3GPP TS 23.008 version 9.2.0 Release 9)", 99 pages.

ETSI TS 129 118 V 8.5.0 (Apr. 2010), "Universal Mobile Telecommunications System (UMTS); LTE; Mobility Management Entity (MME)—Visitor Location Register (VLR) SGs Interface Specification (3GPP TS 29.118 version 8.5.0 Release 8)", 57 pages.

Nokia Siemens Networks: "MME name", C4-100180, Change Request 23.008 CR 0276 rev 2 Current Version 8.8.0, 3GPP TSG CT4 Meeting #48, San Francisco, CA, USA, Feb. 22-26, 2010, 2 pages.

International Search Report international application No. PCT/EP2011/056088 dated Mar. 6, 2012 12 pages.

ETSI TS 129 002 V 9.1.0, Digital Cellular Telecommunications Systems (Phase 2+); Universal Mobile Telecommunications System (UMTS); Mobile Applications Part (MAP) Specification (3GPP TS 29.002 version 9.1.0 Release 9), 57 pages.

* cited by examiner

MME NAME IN MAP INSERT SUBSCRIBER DATA OPERATION

This application claims priority of U.S. Provisional Patent Application No. 61/329,900, filed Apr. 30, 2010. The subject matter of the earlier filed application is hereby incorporated by reference.

BACKGROUND

1. Field

Some embodiments of the invention relate to communications networks and, particularly, to wireless communications networks, such as the Universal Mobile Telecommunications System (UMTS) Terrestrial Radio Access Network (UTRAN) Long Term Evolution (LTE) and Evolved UTRAN (E-UTRAN).

2. Description of the Related Art

A Universal Mobile Telecommunications System (UMTS) network includes three interacting domains: Core Network (CN), UMTS Terrestrial Radio Access Network (UTRAN) and User Equipment (UE). A main function of the CN is to provide switching, routing and transit for user traffic. The CN may also contain the databases and network management functions.

UTRAN includes base stations, or Node-Bs (NBs), and radio network controllers (RNC). UTRAN allows for connectivity between the UE and the CN. The RNC provides control functionalities for one or more Node Bs. The RNC and its corresponding Node Bs (NBs) are called the Radio Network Subsystem (RNS).

Long Term Evolution (LTE) refers to improvements of the UMTS through improved efficiency and services, lower costs, and use of new spectrum opportunities. In particular, LTE is a $3^{rd}$ Generation Partnership Project (3GPP) standard that provides for an uplink speed of up to 50 megabits per second (Mbps) and a downlink speed of up to 100 Mbps. As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support.

SUMMARY

Embodiments of the present invention include a method. The method includes receiving, at a network node, a terminating request from a user equipment. The method may further include performing a restore data procedure or an update location procedure, receiving a mobility management entity (MME) name from another network element, and registering the MME name to the subscriber data associated with the user equipment. The method then includes sending a paging request only to the MME indicated by the MME name received from the other network element.

Other embodiments of the invention are directed to an apparatus that includes memory including computer program code, and at least one processor. The memory and computer program code, with the at least one processor, are configured to control the apparatus at least to receive a terminating request from a user equipment, perform a restore data procedure or update location procedure, receive a mobility management entity (MME) name from another network element, and register the MME name to the subscriber data associated with the user equipment. The memory and computer program code, with the at least one processor, are further configured to control the apparatus to send a paging request only to the MME indicated by the MME name received from the other network element.

Another embodiment of the invention includes a computer program embodied on a computer readable medium. The computer program, when executed, is configured to control a processor to perform operations. The operations include receiving, at a network node, a terminating request from a user equipment. The operations may further include performing a restore data procedure or update location procedure, receiving a mobility management entity (MME) name from another network element, and registering the MME name to the subscriber data associated with the user equipment. The operations also include sending a paging request only to the MME indicated by the MME name received from the other network element.

BRIEF DESCRIPTION OF THE DRAWINGS

For proper understanding of the invention, reference should be made to the accompanying drawings, wherein.

DETAILED DESCRIPTION

The Evolved Packet System (EPS) is an architecture designed for LTE, and is the successor of the General Packet Radio System (GPRS). EPS is described in 3GPP TS 23.401 and 3GPP TS 23.402, the subject matter of which are hereby incorporated by reference in their entirety. EPS provides a new radio interface and new packet core network functions for broadband wireless data access. Such EPS core network functions include the Mobility Management Entity (MME) 130, Packet Data Network Gateway (PDN-GW) 170, and Serving Gateway (S-GW) 150, as shown in FIG. 1.

Figure 1:
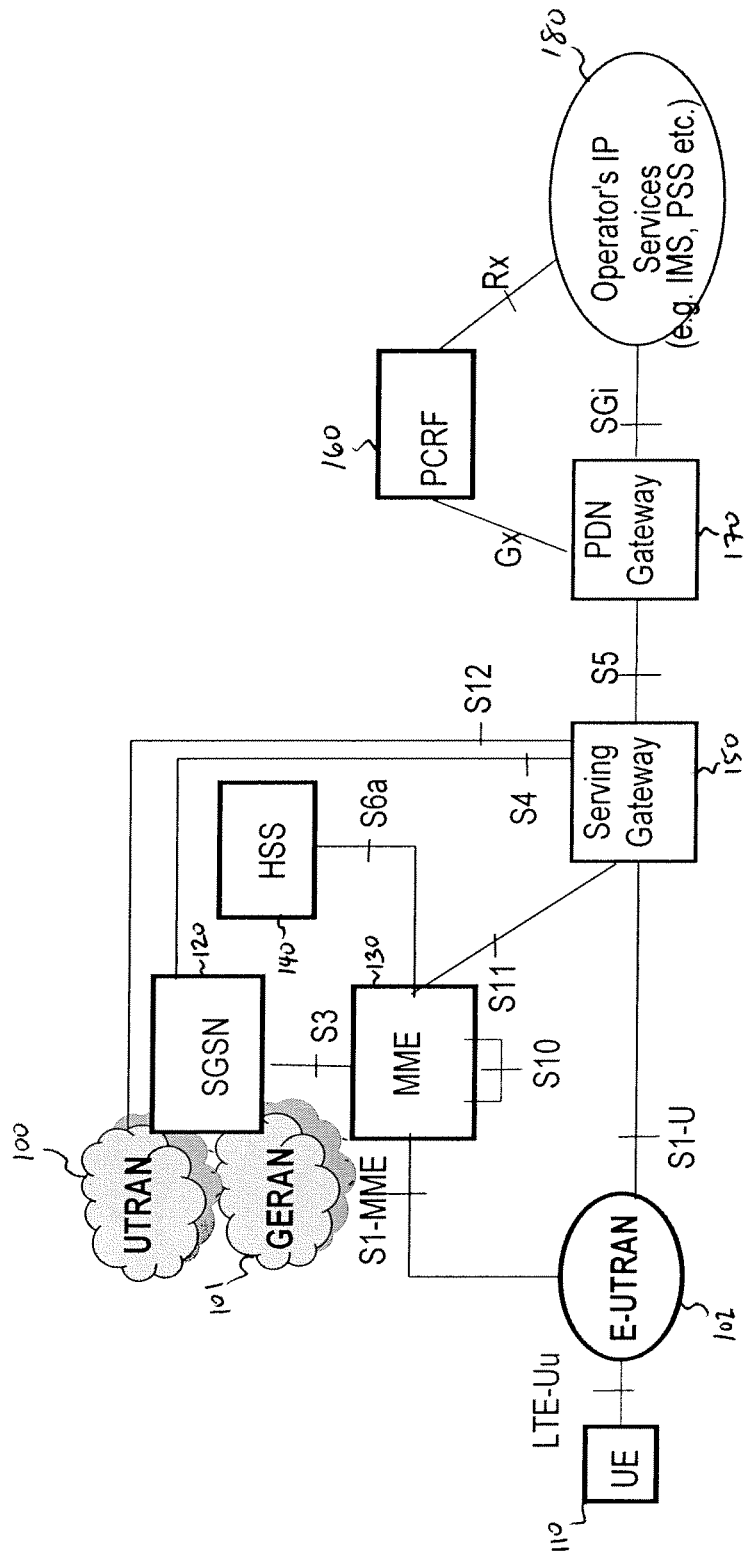
FIG. 1 illustrates an example of a system, according to one embodiment of the invention.

FIG. 1 illustrates an example of an EPS architecture in which certain embodiments of the invention may be implemented. MME 130 is an entity responsible for mobility management procedures in EPS. For example, MME 130 is responsible for knowing a subscriber's location in the E-UTRAN 102. MME 130 authenticates the subscriber and supervises the resources granted for subscribers by controlling gateways. The UE 110 of a subscriber can be either camped on E-UTRAN 102, UTRAN 100, or GERAN 101, but not two accesses simultaneously. That is, when the UE 110 is camped on E-UTRAN 102, it is not reachable over UTRAN 100 or GERAN 101.

A serving GPRS support node (SGSN) 120, which may be responsible for packet routing or transfer and authentication/charging functions, can be included in the architecture illustrated in FIG. 1. Also, a policy charging and rules function (PCRF) 160 may be provided as a node for determining policy rules in the network and determining access to the Operator's IP services 180.

For the initial period of EPS deployments (when EPS access is available in spotted areas), circuit switched fallback (CSFB) has been standardized in 3GPP 23.272 to make usual services like call, short message service (SMS), Locationing and Unstructured Supplementary Service Data (USSD) available for UEs that are camped on E-UTRAN 102. The subject matter of 3GPP 23.272 is hereby incorporated by reference in its entirety. 3GPP 23.272 defines a SGs interface between MME 130 and a mobile services switching center (MSC) server (MSS)/visitor location register (VLR) 190, which will be discussed in more detail below in connection with FIGS. 2 and 3.

When a UE 110 registers in EPS, it can indicate its CSFB capability in the request. If EPS supports CSFB, the MME 130 will perform a location update procedure on the SGs interface on behalf of the UE 110 to a MSS/VLR 190. In turn, MSS/VLR 190 downloads CS subscription data from the home location register (HLR)/home subscriber server (HSS) 140 with the normal location update procedure, and stores the MME ID in the VLR database. As a result, the UE 110 will also be registered into the MSS/VLR 190. Mobile terminated (MT) CS events of the UE 110 (call, SMS, MT-LocationRequest) will be routed to the MSS 190.

When a MT CS event arrives to MSS 190, the MSS 190 sends a paging request to the MME 130 over the SGs interface to indicate the incoming CS event and to search for the location of the UE 110. For call, USSD, and location request (LR) procedures the UE 110 is forced back to the CS network (UTRAN/GERAN) with CS fallback procedure, and when the UE 110 is camped on the CS access network, the actual MT CS procedure (call, Location Request, USSD) is executed by MSS 190 as if the UE 110 was originally in the CS domain. When the service is executed, the UE 110 is returned to EPS.

Figure 2:
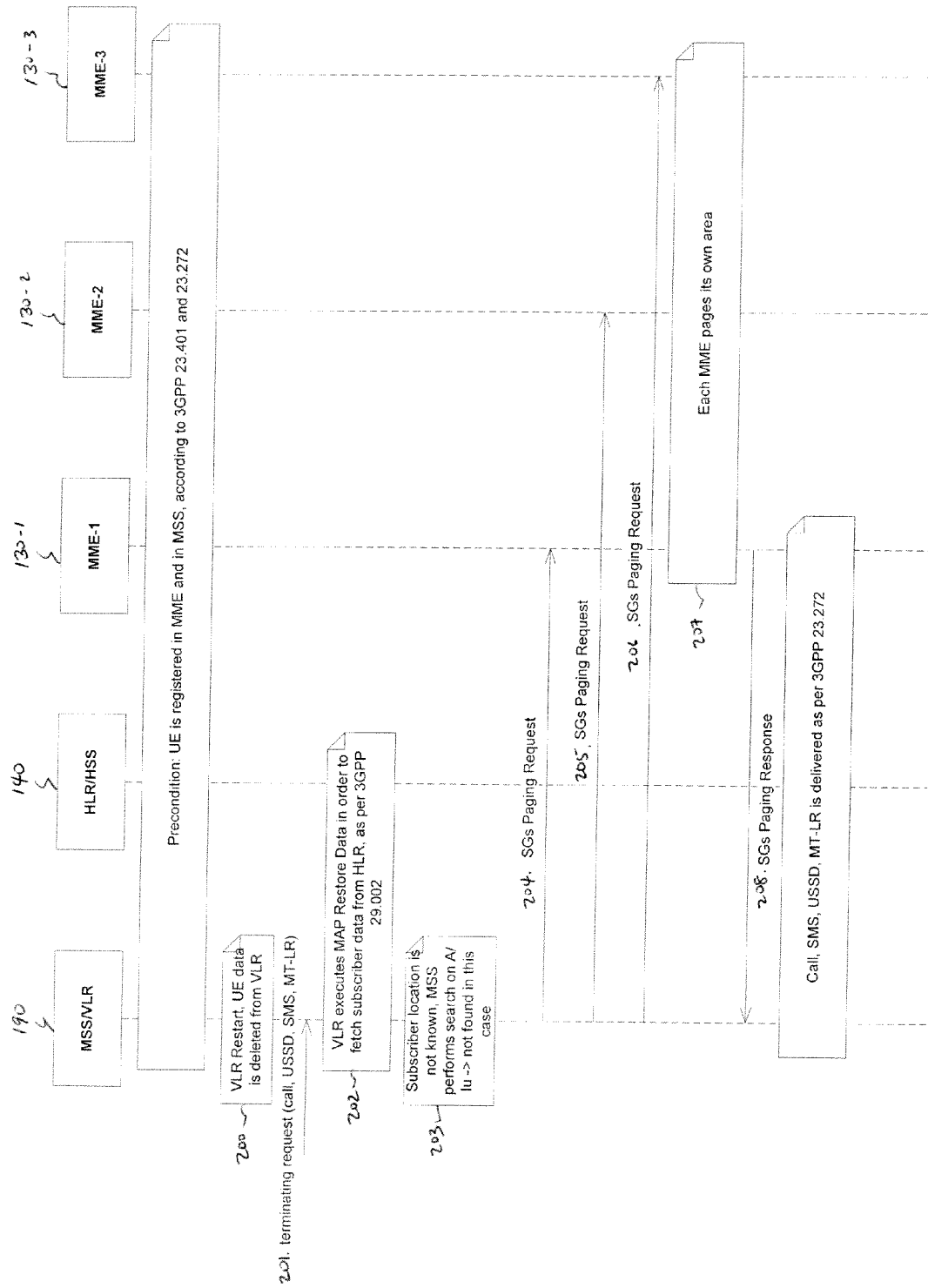
FIG. 2 illustrates a signaling diagram.

However, if subscriber data is deleted from the VLR 190 for some reason (e.g., system restart, VLR restart) and a MT CS event arrives to the MSS 190, the VLR does not know the MME 130 address when the MT CS event arrives before MME 130 would re-register itself to the VLR over the SGs interface. 3GPP 29.118, which is hereby incorporated by reference in its entirety, recommends the execution of a search procedure for this case, as illustrated in FIG. 2.

As shown in FIG. 2, when there is a VLR restart 200 and a terminating request 201 is received, the VLR 190 executes MAP restore data 202 in order to fetch subscriber data from HLR 140, according to 3GPP 29.002 which is hereby incorporated by reference in its entirety. The MSS 190 performs a search for the subscriber location on A/Iu 203, but does not locate the subscriber in this case. The MSS 190 then sends a paging request 204, 205, 206 to every MME 130-1, 130-2, 130-3 it is connected to over the SGs interface to search for the location of the subscriber. After receiving the paging request, each MME 130-1, 130-2, 130-3 pages its own area 207 in an effort to determine the location of the subscriber, and returns a paging response 208 over SGs interface to the MSS 190. The paging response may include an indication of the location of the subscriber when the MME has located the subscriber.

Accordingly, as shown in FIG. 2, the MSS 190 needs to send a paging request to every MME 130-1, 130-2, 130-3 it is connected to. This results in a very burdensome operation, especially considering that a VLR restart can affect many subscribers, and the MSS 190 would need to perform a search procedure for all the affected subscribers.

Figure 3:
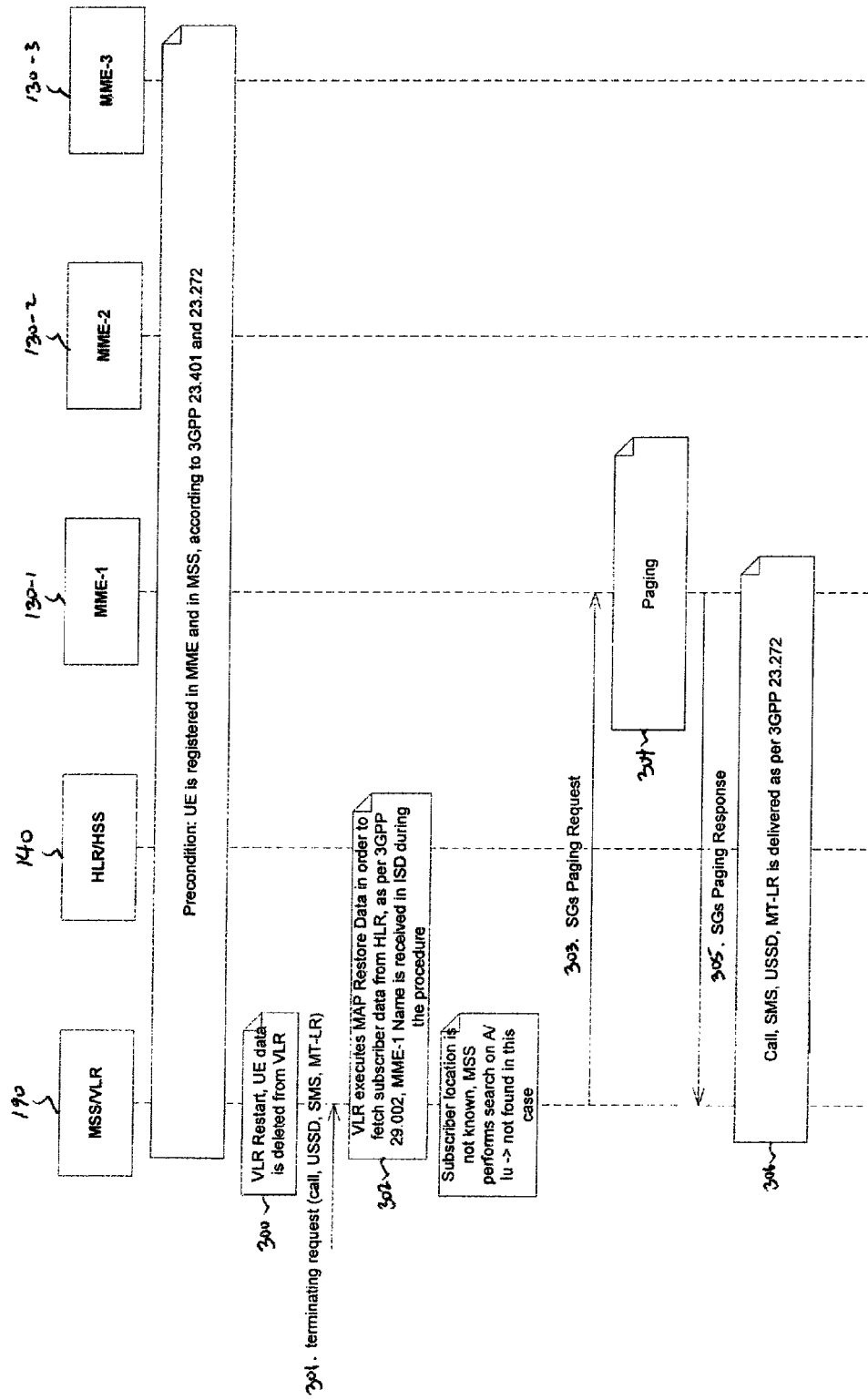
FIG. 3 illustrates a signaling diagram, according to an embodiment.

Therefore, embodiments of the invention take advantage of the fact that the MME name is already delivered to the HLR 140 when the subscriber registers to the MME 130. More specifically, embodiments of the invention propose the inclusion of a MME Name into a mobile application part (MAP) insert-subscriber-data (ISD) message, as shown in FIG. 3. Thus, when a MT CS event arrives to the MSS 190, and MSS/VLR 190 performs a Restore Data procedure, the MME Name would be received together with other subscriber data from HLR 140. As a consequence, MSS/VLR 190 would be aware of the current MME of the subscriber, and a paging request would be sent only to that MME, thus avoiding a search procedure.

In one embodiment, the MME name is a parameter that contains the Diameter Identity of the MME 130. If the subscriber is registered to EPS, the HLR 140 sends the MME name to VLR 190 during the data restoration procedure if a restoration indicator is set in the MAP_Restore_Data request. If the restoration indicator is set in the MAP_Update_Location request, the HLR 140 sends the MME name to VLR 190 during an update location procedure.

The restoration indicator, according to one embodiment, is a parameter that, if present, indicates that the HLR sends in the MAP Insert Subscriber Data (ISD) the MME name if the subscriber is registered to EPS, or sends the SGSN number if available and if the subscriber is registered to GPRS. The VLR may set the restoration indicator during a CSFB mobile originated call if the VLR performs an implicit location update.

FIG. 3 illustrates an exemplary signaling diagram, according to one embodiment of the invention. Similar to FIG. 2, when there is a VLR restart 300 and a terminating request 301 is received, the VLR 190 executes MAP restore data 302 in order to fetch subscriber data from HLR 140. However, rather than paging all MMEs 130-1, 130-2, 130-3 it is connected to, the MSS 190 registers an MME name to the subscriber data and receives the MME name from the HLR in response to the restore data procedure 302. If the HLR of CS mobile data and MME data are not in the same network element, then the HLR 140 executing the restore data procedure can fetch the MME name from the other HLR/HSS.

In one embodiment, the MME name may be received from the HLR 140 in a MAP insert subscriber data service (ISD). As a result, the MSS only needs to send a paging request 303 on the SGs interface to the one MME 130-1 indicated by the MME name in the ISD received from the HLR 140. After receiving the paging request, the MME pages 304 its own area in an effort to determine the location of the subscriber, and returns a paging response 305 over SGs interface to the MSS 190. The paging response 305 may include an indication of the location of the subscriber when the MME has located the subscriber. The call, SMS, USSD, and/or MT-LR may then be delivered as described in 3GPP 23.272, which is hereby incorporated by reference in its entirety.

Therefore, as discussed above, when the HLR receives a restore data request, and a MME name is registered to the subscription data, the HLR 140 returns with the MME name in a MAP insert subscriber data service (ISD) to the MSS 190. This avoids the need to perform a search procedure since a paging request will only need to be sent to the MME 130-1 indicated by the MME name received in the MAP ISD. Embodiments of the invention can be implemented, for example, in networks that use a HLR product with S6a interface towards MME or HLR, and is able to fetch the identity of MME by using some other means in order to correctly populate subscription data.

As would be understood by a person of skill in the art, the mobile application part (MAP) is an SS7 protocol which provides an application layer for the various nodes in, for example, UMTS mobile core networks to communicate with each other in order to provide services to subscribers. The MAP is the application-layer protocol used to access the HLR, VLR, MSC, equipment identity register, authentication center, SMS center, and serving GPRS support node.

Figure 4:
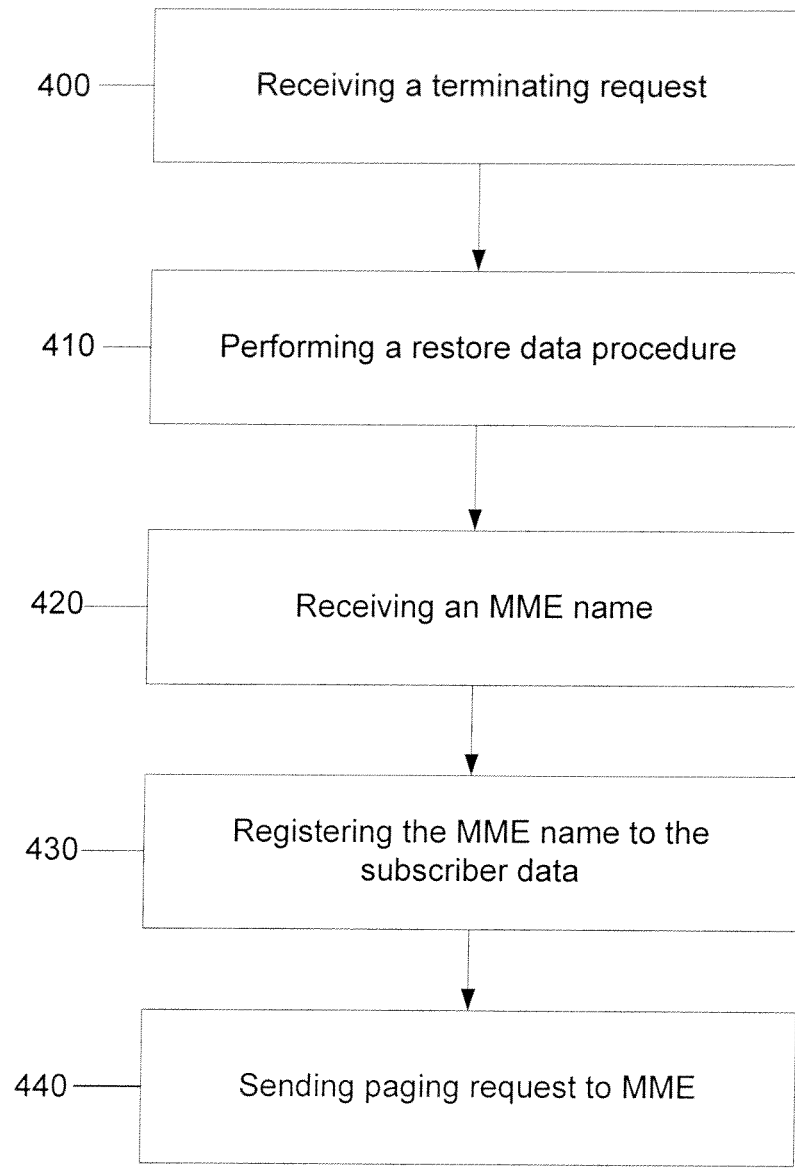
FIG. 4 illustrates a flow chart of a method, according to one embodiment.

FIG. 4 illustrates a method for mobility management according to one embodiment of the invention. The method includes, at 400, receiving, at a MSS or VLR, a terminating request from a UE. The terminating request may be a mobile terminated CS event, and the terminating request may be received after a VLR restart that deletes subscriber data associated with the UE. In response to receiving the terminating request, the method further includes, at 410, performing, by the MSS or VLR, a restore data procedure and/or an update location procedure. At 420, the method includes receiving an MME name from the HLR during the restore data procedure and/or the update location procedure. The method then includes, at 430, registering the MME name to the subscriber data associated with the UE. At 440, the method includes sending a paging request only to the MME indicated by the MME name received from the HLR.

According to certain embodiments, the method described above can be stored as instructions on a computer readable medium and executed by a processor. The computer-readable medium may be a non-transitory medium that can be encoded with information that, when executed in hardware, performs a process corresponding to the process disclosed in FIG. 4, or any other process discussed herein. Examples of non-transitory mediums include a computer-readable medium, a computer distribution medium, a computer-readable storage medium, and a computer program product.

Figure 5:
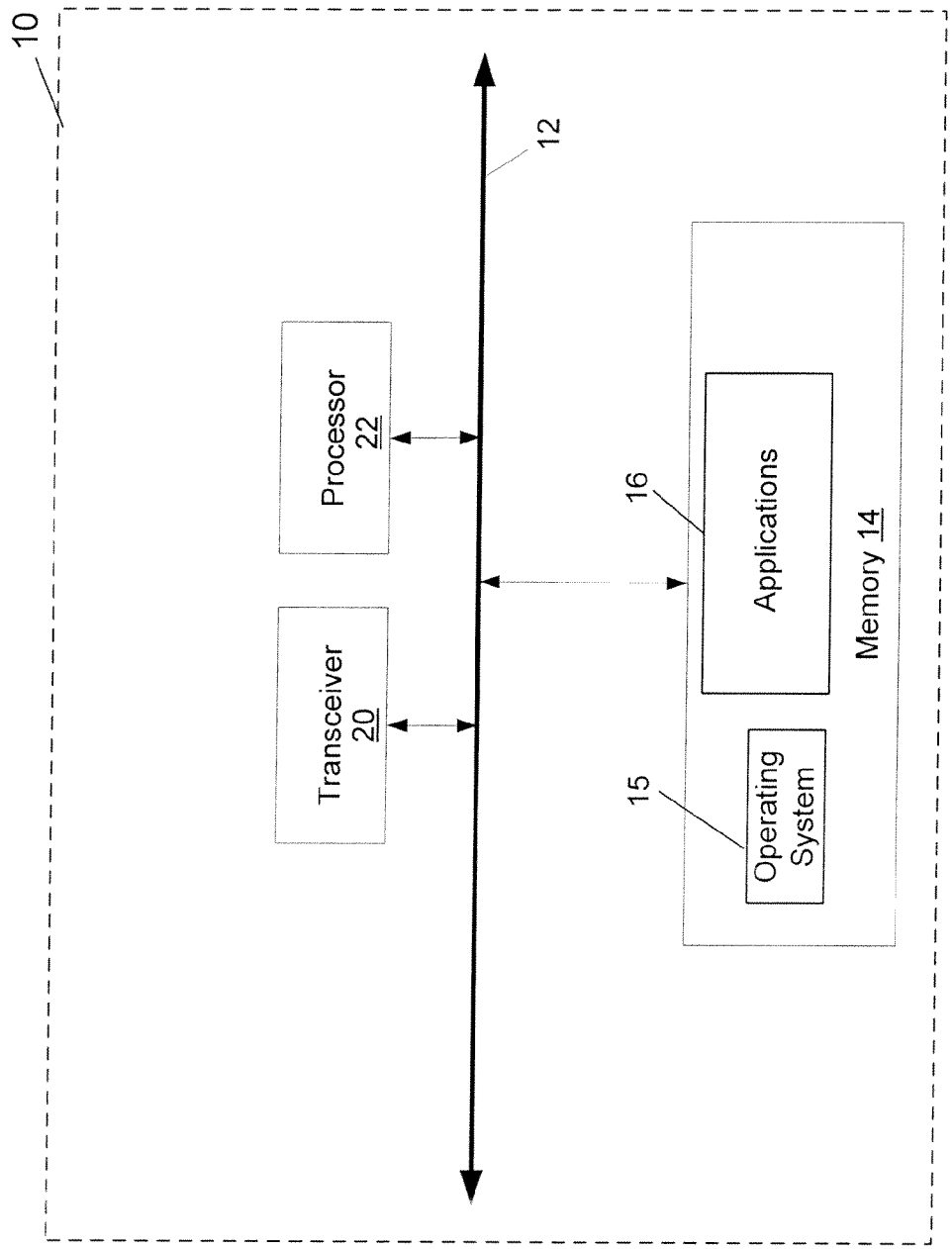
FIG. 5 illustrates an apparatus, according to an embodiment of the invention.

FIG. 5 illustrates an apparatus 10 that may be configured to provide mobility management services, according to one embodiment. In some embodiments, the apparatus 10 is implemented in a network element, such as a computing system, server, register, etc. Apparatus 10 may include a communications interface 12, such as a bus or other communications mechanism, for communicating information between components of apparatus 10. Alternatively, the components of apparatus 10 may communicate directly with each other, without use of communications interface 12.

Apparatus 10 also includes a processor 22, coupled to communications interface 12, for receiving, managing, and/or processing user input or information, and for executing instructions or operations. Processor 22 may be any type of general or specific purpose processor. In one embodiment, processor 22 may be included within an application specific integrated circuit (ASIC).

Apparatus 10 further includes a memory 14 for storing information and instructions to be executed by processor 22. Memory 14 can be comprised of any combination of random access memory (RAM), read only memory (ROM), static storage such as a magnetic or optical disk, or any other type of machine or computer readable media. Computer readable media may be any available media that can be accessed by processor 22 and could include volatile or nonvolatile media, removable or non-removable media, and communication media. Communication media may include computer program code or instructions, data structures, program modules or other data, and includes any information delivery media.

Apparatus 10 can further include a transceiver 20 for receiving and/or transmitting information from and to other network elements in the network. Transceiver 20 can be a separate component of apparatus 10 or, alternatively, transceiver 20 can be included as a function of processor 22. In one embodiment, memory 14 stores software modules or applications 16 that provide functionality when executed by processor 22. The modules may include an operating system 15 that provides operating system functionality for apparatus 10.

As illustrated in FIG. 5, some embodiments of the invention are directed to an apparatus 10. The apparatus 10 includes at least one processor 22, and at least one memory 14 including computer program code. The at least one memory 14 and the computer program code are configured, with the at least one processor 22, to cause the apparatus 10 at least to receive a terminating request from a UE. In some embodiments, the terminating request is a mobile terminated CS event, such as a call, USSD, SMS, or MT-LR. The terminating request may be received after a VLR restart that deletes subscriber data associated with the UE. The at least one memory 14 and the computer program code are further configured, with the at least one processor 22, to cause the apparatus 10 to perform a restore data procedure and/or an update location procedure, and to receive an MME name from the HLR during the restore data procedure and/or the update location procedure. The at least one memory 14 and the computer program code are further configured, with the at least one processor 22, to cause the apparatus 10 to register the MME name to the subscriber data, and to send a paging request only to the MME indicated by the MME name received from the HLR. In some embodiments, apparatus 10 is a MSS and/or VLR.

The computer readable medium mentioned above may be at least partially embodied by a transmission line, a compact disk, digital-video disk, a magnetic tape, a Bernoulli drive, a magnetic disk, holographic disk or tape, flash memory, magnetoresistive memory, integrated circuits, or any other digital processing apparatus memory device.

It should be noted that many of the functional features described in this specification have been presented as modules, applications or the like, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code or algorithm could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
  receiving, at a network element, a terminating request from a user equipment;
  performing at least one of a restore data procedure and an update location procedure;
  receiving a mobility management entity name from a home location register;
  registering the mobility management entity name to subscriber data associated with the user equipment; and
  sending a paging request only to a mobility management entity indicated by the received mobility management entity name,
  wherein the receiving of the mobility management entity name comprises receiving the mobility management entity name during the restore data procedure when a restoration indicator is set in a mobile application part restore data request.

2. The method according to claim 1, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

3. The method according to claim 1, wherein the receiving of the terminating request comprises receiving a mobile terminated circuit switched event.

4. The method according to claim 1, wherein the receiving of the mobility management entity name comprises receiving the mobility management entity name in a mobile application part insert subscriber data service.

5. A method, comprising:
  receiving, at a network element, a terminating request from a user equipment;
  performing at least one of a restore data procedure and an update location procedure;
  receiving a mobility management entity name from a home location register;
  registering the mobility management entity name to subscriber data associated with the user equipment; and
  sending a paging request only to a mobility management entity indicated by the received mobility management entity name,
  wherein the receiving of the mobility management entity name comprises receiving the mobility management entity name during the update location procedure when a restoration indicator is set in a mobile application part update location request.

6. The method according to claim 5, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

7. A method, comprising:
  receiving, at a network element, a terminating request from a user equipment;
  performing at least one of a restore data procedure and an update location procedure;
  receiving a mobility management entity name from a home location register;
  registering the mobility management entity name to subscriber data associated with the user equipment; and
  sending a paging request only to a mobility management entity indicated by the received mobility management entity name,
  wherein the network element comprises at least one of a mobile services switching center server and a visitor location register,
  the method further comprising setting the restoration indicator by the visitor location register.

8. A method, comprising:
  receiving, at a network element, a terminating request from a user equipment;
  performing at least one of a restore data procedure and an update location procedure;
  receiving a mobility management entity name from a home location register;
  registering the mobility management entity name to subscriber data associated with the user equipment; and
  sending a paging request only to a mobility management entity indicated by the received mobility management entity name,
  wherein the receiving of the terminating request comprises receiving the terminating request after a visitor location register restart that deletes the subscriber data associated with the user equipment.

9. An apparatus, comprising:
  at least one processor; and
  at least one memory including computer program code,
  the at least one memory and the computer program code configured, with the at least one processor, to cause the apparatus at least to
    receive a terminating request from a user equipment;
    perform at least one of a restore data procedure and an update location procedure;
    receive a mobility management entity name from a home location register;
    register the mobility management entity name to subscriber data associated with the user equipment; and
    send a paging request only to a mobility management entity indicated by the received mobility management entity name,
  wherein the at least one memory and the computer program code are further configured, with the at least one processor, to cause the apparatus at least to receive the mobility management entity name during the restore data procedure when a restoration indicator is set in a mobile application part restore data request.

10. The apparatus according to claim 9, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

11. The apparatus according to claim 9, wherein the apparatus comprises at least one of a mobile services switching center server and a visitor location register, and wherein the restoration indicator is set by the visitor location register.

12. The apparatus according to claim 9, wherein the at least one memory and the computer program code are further configured, with the at least one processor, to cause the apparatus at least to receive a mobile terminated circuit switched event as the terminating request.

13. An apparatus, comprising:
at least one processor; and
at least one memory including computer program code,
the at least one memory and the computer program code configured, with the at least one processor, to cause the apparatus at least to
receive a terminating request from a user equipment;
perform at least one of a restore data procedure and an update location procedure;
receive a mobility management entity name from a home location register;
register the mobility management entity name to subscriber data associated with the user equipment; and
send a paging request only to a mobility management entity indicated by the received mobility management entity name,
wherein the at least one memory and the computer program code are further configured, with the at least one processor, to cause the apparatus at least to receive the mobility management entity name during the update location procedure when a restoration indicator is set in a mobile application part update location request.

14. The apparatus according to claim 13, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

15. The apparatus according to claim 13, wherein the apparatus comprises at least one of a mobile services switching center server and a visitor location register, and wherein the restoration indicator is set by the visitor location register.

16. An apparatus, comprising:
at least one processor; and
at least one memory including computer program code,
the at least one memory and the computer program code configured, with the at least one processor, to cause the apparatus at least to
receive a terminating request from a user equipment;
perform at least one of a restore data procedure and an update location procedure;
receive a mobility management entity name from a home location register;
register the mobility management entity name to subscriber data associated with the user equipment; and
send a paging request only to a mobility management entity indicated by the received mobility management entity name,
wherein the at least one memory and the computer program code are further configured, with the at least one processor, to cause the apparatus at least to receive the terminating request after a visitor location register restart that deletes the subscriber data associated with the user equipment.

17. A computer program, embodied on a non-transitory computer readable medium, the computer program configured to control a processor to perform operations, comprising:
receiving, at a network node, a terminating request from a user equipment;
performing at least one of a restore data procedure and an update location procedure;
receiving a mobility management entity name from a home location register;
registering the mobility management entity name to subscriber data associated with the user equipment; and
sending a paging request only to a mobility management entity indicated by the received mobility management entity name,
wherein the receiving of the mobility management entity name comprises receiving the mobility management entity name during the restore data procedure when a restoration indicator is set in a mobile application part restore data request.

18. The computer program according to claim 17, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

19. The computer program according to claim 17, further comprising setting the restoration indicator by the visitor location register.

20. The computer program according to claim 17, wherein the receiving of the terminating request comprises receiving a mobile terminated circuit switched event.

21. The computer program according to claim 17, wherein the receiving of the mobility management entity name comprises receiving the mobility management entity name in a mobile application part insert subscriber data service.

22. A computer program, embodied on a non-transitory computer readable medium, the computer program configured to control a processor to perform operations, comprising:
receiving, at a network node, a terminating request from a user equipment;
performing at least one of a restore data procedure and an update location procedure;
receiving a mobility management entity name from a home location register;
registering the mobility management entity name to subscriber data associated with the user equipment; and
sending a paging request only to a mobility management entity indicated by the received mobility management entity name,
wherein the receiving of the mobility management entity name comprises receiving the mobility management entity name during the update location procedure when a restoration indicator is set in a mobile application part update location request.

23. The method according to claim 22, wherein the restoration indicator is configured to indicate that the mobility management entity name is received from the home location register when the user equipment is registered to an evolved packet system, and wherein the restoration indicator is configured to indicate that a serving general packet radio system support node number is received when available and when the user equipment is registered to the general packet radio system.

24. The computer program according to claim 22, further comprising setting the restoration indicator by the visitor location register.

25. A computer program, embodied on a non-transitory computer readable medium, the computer program configured to control a processor to perform operations, comprising:
- receiving, at a network node, a terminating request from a user equipment;
- performing at least one of a restore data procedure and an update location procedure;
- receiving a mobility management entity name from a home location register;
- registering the mobility management entity name to subscriber data associated with the user equipment; and
- sending a paging request only to a mobility management entity indicated by the received mobility management entity name,
- wherein the receiving of the terminating request comprises receiving the terminating request after a visitor location register restart that deletes the subscriber data associated with the user equipment.

* * * * *